US009394826B1

(12) United States Patent
Ebert

(10) Patent No.: US 9,394,826 B1
(45) Date of Patent: Jul. 19, 2016

(54) CIRCULATING FLUIDIZED BED COOLING FOR AN INDUSTRIAL GAS TURBINE ENGINE

(71) Applicant: Todd A Ebert, West Palm Beach, FL (US)

(72) Inventor: Todd A Ebert, West Palm Beach, FL (US)

(73) Assignee: S & J DESIGN LLC, Jupiter, FL (US)

( * ) Notice: Subject to any disclaimer, the term of this patent is extended or adjusted under 35 U.S.C. 154(b) by 777 days.

(21) Appl. No.: 13/835,692

(22) Filed: Mar. 15, 2013

Related U.S. Application Data

(60) Provisional application No. 61/640,320, filed on Apr. 30, 2012.

(51) Int. Cl.
*F02C 1/00* (2006.01)
*F02C 7/00* (2006.01)

(52) U.S. Cl.
CPC ........................................ *F02C 7/00* (2013.01)

(58) Field of Classification Search
CPC .............. F02C 7/052; F05D 2260/607; B64D 2033/0246
USPC ............................................................ 60/772
See application file for complete search history.

(56) References Cited

U.S. PATENT DOCUMENTS

| 2011/0067409 A1* | 3/2011 | Beeck | F01D 5/08 60/772 |
| 2012/0057967 A1* | 3/2012 | Laurello | F01D 5/081 415/178 |

* cited by examiner

*Primary Examiner* — Jason Shanske
(74) *Attorney, Agent, or Firm* — John Ryznic

(57) ABSTRACT

The present invention is an industrial gas turbine engine with a circulating fluidized bed cooling system to provide cooling to certain parts of the engine such as a transition duct or a stator vane. The circulating fluidized bed cooling system can be used to cool a stator vane, a casing, or any stationary part of the engine. A circulating fluidized bed cooling system uses very fine particles that pass along with a cooling fluid such as cooling air and provide for a much higher heat transfer coefficient than does turbulent flow cooling air because of the particles. The fine particles produce conduction cooling from the hot surface to the particles that are then carried along in the circulating fluid flow to another location where the heat picked up by the particles is then transferred out from the particles.

9 Claims, 2 Drawing Sheets

CIRCULATING FLUIDIZED BED COOLING FOR AN INDUSTRIAL GAS TURBINE ENGINE

CROSS-REFERENCE TO RELATED APPLICATIONS

This application claims the benefit to a Provisional Application 61/640,320 filed on Apr. 30, 2012.

GOVERNMENT LICENSE RIGHTS

None.

BACKGROUND OF THE INVENTION

1. Field of the Invention

The present invention relates generally to a gas turbine engine, and more specifically to.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes) must be cooled by passing cooling air through internal cooling passages and discharging the cooling air through film cooling holes to provide a blanket layer of cooling air to protect the hot metal surface from the hot gas stream.

A fluidized bed is formed when a quantity of a solid particulate substance (usually present in a holding vessel) is placed under appropriate conditions to cause the solid/fluid mixture to behave as a fluid. This is usually achieved by the introduction of pressurized fluid through the particulate medium. This results in the medium then having many properties and characteristics of normal fluids; such as the ability to free-flow under gravity, or to be pumped using fluid type technologies.

The resulting phenomenon is called fluidization. Fluidized beds are used for several purposes, such as fluidized bed reactors (types of chemical reactors), fluid catalytic cracking, fluidized bed combustion, heat or mass transfer or interface modification, such as applying a coating onto solid items. This technique is also becoming more common in Aquaculture for the production of shellfish in Integrated Multi-Trophic Aquaculture systems.

A fluidized bed consists of fluid-solid mixture that exhibits fluid-like properties. As such, the upper surface of the bed is relatively horizontal, which is analogous to hydrostatic behavior. The bed can be considered to be an inhomogeneous mixture of fluid and solid that can be represented by a single bulk density.

Furthermore, an object with a higher density than the bed will sink, whereas an object with a lower density than the bed will float, thus the bed can be considered to exhibit the fluid behavior expected of Archimedes' principle. As the "density" (actually the solid volume fraction of the suspension) of the bed can be altered by changing the fluid fraction, objects with different densities comparative to the bed can, by altering either the fluid or solid fraction, be caused to sink or float.

In fluidized beds, the contact of the solid particles with the fluidization medium (a gas or a liquid) is greatly enhanced when compared to packed beds. This behavior in fluidized combustion beds enables good thermal transport inside the system and good heat transfer between the bed and its container. Similarly to the good heat transfer, which enables thermal uniformity analogous to that of a well-mixed gas, the bed can have a significant heat-capacity whilst maintaining a homogeneous temperature field.

BRIEF SUMMARY OF THE INVENTION

The present invention is an industrial gas turbine engine with a circulating fluidized bed cooling system to provide cooling to certain parts of the engine such as a transition duct or a stator vane. The circulating fluidized bed cooling system can be used to cool a stator vane, a casing, or any stationary part of the engine. A circulating fluidized bed cooling system uses very fine particles that pass along with a cooling fluid such as cooling air and provide for a much higher heat transfer coefficient than does turbulent flow cooling air because of the particles. The fine particles produce conduction cooling from the hot surface to the particles that are then carried along in the circulating fluid flow to another location where the heat picked up by the particles is then transferred out from the particles. Glass particles with a diameter per particle of around 88 um can be used with 80 kg/m$^3$ of cooling air.

A closed loop particle cooling passage is formed that passes through the transition duct and through a particle separator that separates the particles from the heated cooling air, and then through a heat exchanger that cools the particles for reuse. A make-up particles passage and a cooling air supply passage are connected to the closed loop particle cooling passage between the heat exchanger and the transition duct.

A hot cooling air passage is connected to the particle separator to carry the hot cooling air without the particles to another heat exchanger that is used to cool the cooling air prior to being reintroduced into the closed loop particle cooling circuit.

DETAILED DESCRIPTION OF THE INVENTION

The present invention is an industrial gas turbine engine with a circulating fluidized bed cooling system to provide cooling to certain parts of the engine such as a transition duct or a stator vane. The circulating fluidized bed cooling system can be used to cool a stator vane, a casing, or any stationary part of the engine. A circulating fluidized bed cooling system uses very fine particles that pass along with a cooling fluid such as cooling air and provide for a much higher heat transfer coefficient than does turbulent flow cooling air because of the particles. The fine particles produce conduction cooling from the hot surface to the particles that are then carried along in the circulating fluid flow to another location where the heat picked up by the particles is then transferred out from the particles. Glass particles with a diameter per particle of around 88 um can be used with 80 kg/m$^3$ of cooling air.

In testing, the applicant has discovered that the heat transfer coefficient for a circulating fluidized bed system can be from 7 to 18 times greater than the prior art turbulent flow cooling air that makes use of trip strips on hot wall surfaces in which convection cooling occurs. Because of the use of the fine particles flowing along with cooling air in an enclosed passage, much more effective cooling for the transition ducts or the stator vanes can be produced. With much more effective cooling over the prior art turbulent flow cooling air, less overall cooling air flow is required for the same cooling effectiveness and thus a higher efficiency engine can be produced because of the lower demand for compressed air bled off from the compressor.

Figure 1:
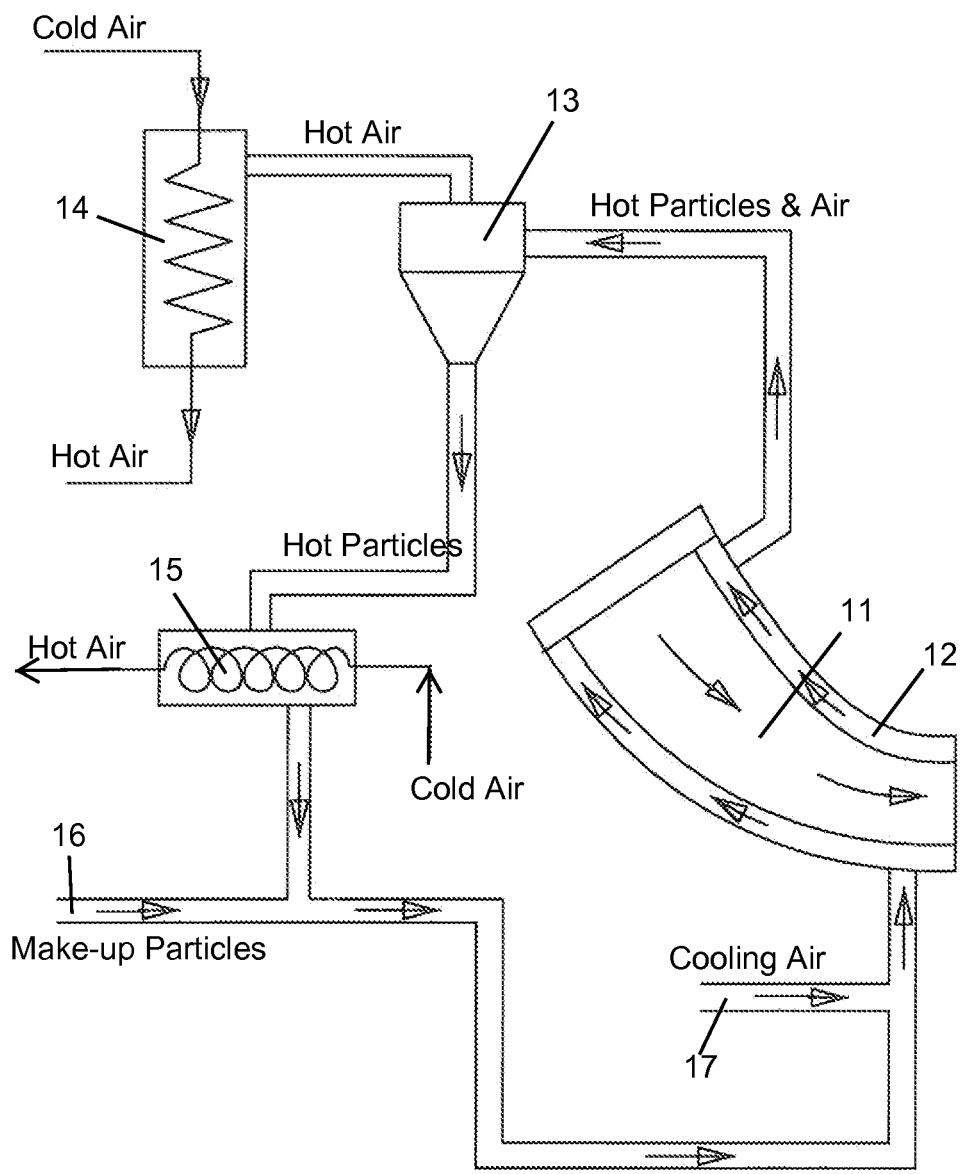
FIG. 1 shows a schematic view of a transition duct of an industrial gas turbine engine with a circulating fluidized bed cooling system to provide cooling for the transition duct according to the present invention.
Figure 2:
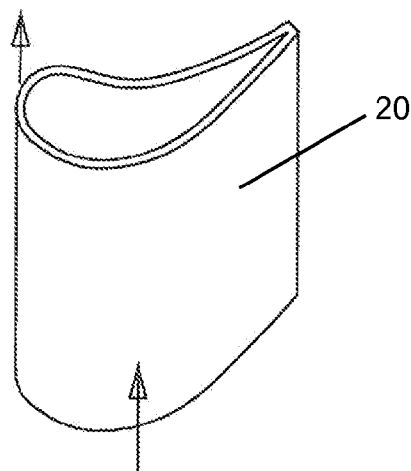
FIG. 2 shows an airfoil of a stator vane used in an industrial gas turbine engine that is cooled using the circulating fluidized bed cooling system of the present invention.

FIG. 1 shows a schematic view of one embodiment of the present invention for use in an industrial gas turbine (IGT) engine. The circulating fluidized bed cooling system is best used in an IGT engine because weight is not an issue like in an aero engine. A transition duct 11 channels a hot gas stream from a combustor exit and into the turbine. Cooling of the transition duct is required because of the extremely high gas stream temperatures in order to prevent erosion or other thermal damage that will shorten part life. Cooling air passages 12 extend around the transition duct 11 in which cooling air and very fine particles will flow to provide for the cooling.

The circulating fluidized bed cooling circuit includes a closed system in which the particles are passed through the transition duct to pick up heat and carry to a heat exchanger for removal of heat. The cooling air passages 12 in the transition duct 11 carries the particles in the cooling air to a cyclonic separator 13 where the hot particles flow down and the hot cooling air flows to a heat exchanger 14. The hot particles are cooled in a second heat exchanger 15 in which cold air passes through the heat exchanger 15. The cooled down particles from the heat exchanger 15 are then passed into the cooling passages 12 formed around the transition duct 11 for another cycle.

The cooling passages 12 in the transition duct 11 are closed off from the hot gas stream so that no particles will enter the hot gas stream. Thus, in the embodiment for cooling the transition duct, no film cooling is used. In another embodiment, a separate cooling air passage could be used for film cooling of the transition duct 11 with a second cooling air passage separated from the first in which the particles will flow through.

Additional particles can be added to the closed system through a make-up particle inlet 16 located downstream from the particle heat exchanger 15. Additional cooling air can be added to the closed system in the cooling air make-up line 17 located upstream of the transition duct 11 cooling passages 12.

Figure 3:
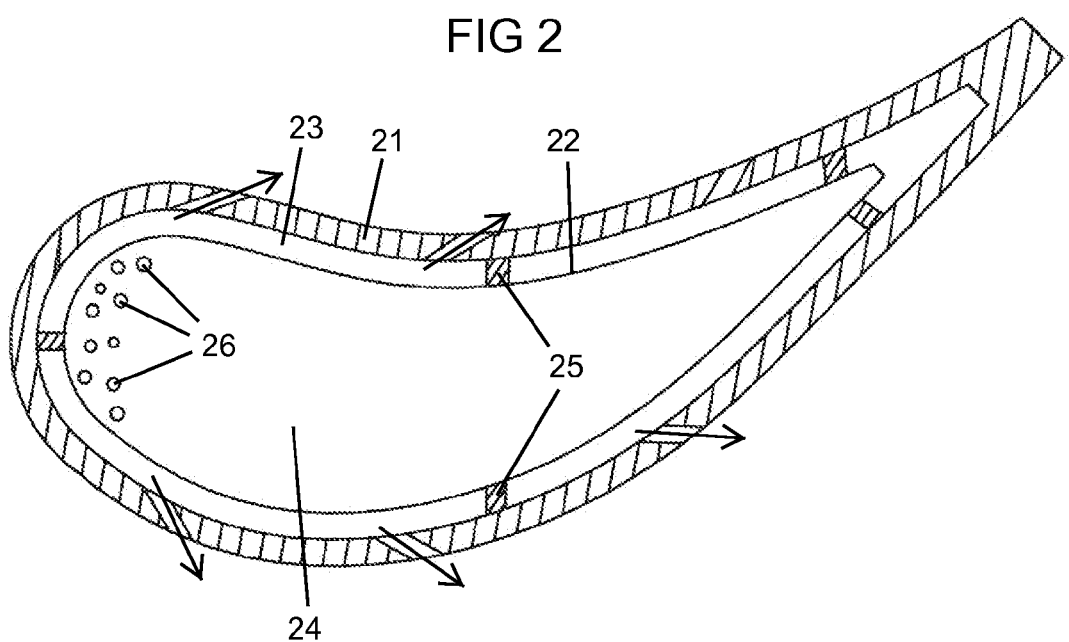
FIG. 3 shows a cross section top view of the airfoil with cooling passages for use in the circulating fluidized bed cooling system of the present invention.

FIG. 3 shows a stator vane with a cooling circuit in which clean cooling air and cooling air with the particles can flow through in order to produce for the improved cooling capability of the circulating fluidized bed cooling system. The stator vane includes an airfoil 21 with an external surface on which a hot gas stream flows over, an insert 22 that forms a clean cooling air passage 23 between the airfoil and the insert 22, and stand-off pins 25 arranged around to secure the insert 22 in place within the airfoil 21. An arrangement of film cooling air holes is positioned around the airfoil to discharge cooling air from the clean cooling air passage 23.

Cooling air with the fine particles 26 flows through the passage 24 formed within the insert 22 to produce conduction cooling. The particles 26 will not mix with the clean cooling air flowing within the passage 23. The FIG. 1 arrangement would be used to provide the circulating fluidized bed cooling for the stator vane where the vane would replace the transition duct 11. The cooling air with the cooler particles would flow into the vane inner cooling passage 24 and then flow out and into the cyclonic separator 13.

I claim the following:

1. An industrial gas turbine engine comprising:
   a combustor to supply a hot gas stream;
   a transition duct connected to an outlet of the combustor;
   a turbine connected to the transition duct;
   a cooling air passage surrounding the transition duct;
   the cooling air passage having an inlet and an outlet;
   a particle separator connected to the outlet of the cooling air passage;
   a particle outlet of the particle separator connected to the inlet of the cooling air passage;
   a heat exchanger connected between the outlet of the particle separator and the inlet of the cooling air passage;
   a closed loop particle cooling circuit formed between the outlet of the cooling air passage and the inlet of the cooling air passage; and,
   a plurality of fine particles flowing through the cooling air passage within the transition duct that increase a heat transfer rate of the cooling air.

2. The industrial gas turbine engine of claim 1, and further comprising:
   the plurality of fine particles are glass particles.

3. The industrial gas turbine engine of claim 2, and further comprising:
   the glass particles have a diameter of less than 100 microns.

4. The industrial gas turbine engine of claim 1, and further comprising:
   the heat exchanger cools the plurality of fine particles passing through the closed loop particle cooling circuit.

5. The industrial gas turbine engine of claim 1, and further comprising:
   a hot air passage extending from the particle separator and connected to a second heat exchanger to cool hot cooling air flowing out from the particle separator.

6. The industrial gas turbine engine of claim 1, and further comprising:
   a make-up particles passage connected to the closed loop particle cooling circuit downstream from the heat exchanger and upstream from the transition duct.

7. The industrial gas turbine engine of claim 1, and further comprising:
   a make-up particles passage connected to the closed loop particle cooling circuit downstream from the heat exchanger and upstream from the transition duct; and,
   a cooling air supply passage connected to the closed loop particle cooling circuit downstream from the make-up particles passage and upstream from the transition duct.

8. A process for cooling a transition duct of an industrial gas turbine engine comprising the steps of:
   passing a plurality of heat transfer increasing particles and cooling air through a cooling passage surrounding the transition duct, the heat transfer increasing particles and the cooling air absorbing heat from the transition duct;
   passing the heated cooling air and the heated heat transfer increasing particles from the transition duct to a particle separator to separate the heated heat transfer increasing particles from the heated cooling air;

cooling off the heated heat transfer increasing particles;

passing the cooled off heat transfer increasing particles into a cooling air stream; and, passing the cooling air stream with the cooled off heat transfer increasing particles through the cooling passage surrounding the transition duct.

9. The process for cooling a transition duct of an industrial gas turbine engine of claim 8, and further comprising the steps of:

passing the heated cooling air from the particle separator after the heat transfer increasing particles have been separated through a heat exchanger to cool the heated cooling air; and, mixing the cooled off heat transfer increasing particles with the cooled cooling air prior to passing the cooled cooling air and cooled of heat transfer increasing particles through the cooling passage surrounding the transition duct.

* * * * *